(12) United States Patent
Reeve et al.

(10) Patent No.: US 12,499,438 B2
(45) Date of Patent: Dec. 16, 2025

(54) SYSTEMS AND METHODS FOR ENTITY LABELING BASED ON BEHAVIOR

(71) Applicant: Coinbase, Inc., Oakland, CA (US)

(72) Inventors: Alex Reeve, San Francisco, CA (US); Harrison Dahme, Stateline, NV (US); Linwei Chen, New York, NY (US); Akash Shah, Oakland, CA (US); Ming Jiang, Foster City, CA (US); Sid Shekhar, London (GB); Zhicong Liang, Seattle, WA (US)

(73) Assignee: Coinbase, Inc., Oakland, CA (US)

( * ) Notice: Subject to any disclaimer, the term of this patent is extended or adjusted under 35 U.S.C. 154(b) by 503 days.

(21) Appl. No.: 17/816,082

(22) Filed: Jul. 29, 2022

(65) Prior Publication Data

US 2024/0037543 A1 Feb. 1, 2024

(51) Int. Cl.
*G06Q 20/38* (2012.01)
*G06F 18/214* (2023.01)
*G06Q 20/40* (2012.01)

(52) U.S. Cl.
CPC ....... *G06Q 20/3829* (2013.01); *G06F 18/214* (2023.01); *G06Q 20/4016* (2013.01)

(58) Field of Classification Search
None
See application file for complete search history.

(56) References Cited

U.S. PATENT DOCUMENTS 10,380,594 B1 * 8/2019 Bayer ................... G06F 16/951
11,373,174 B1 * 6/2022 Cunningham ............ H04L 9/50
(Continued)

FOREIGN PATENT DOCUMENTS

CA  2727831 C  *  2/2019  ............... G06N 7/01
EP  3067849 A1 *  9/2016  ......... G06Q 20/2295

OTHER PUBLICATIONS

Y. Liu, F. R. Yu, X. Li, H. Ji and V. C. M. Leung, "Blockchain and Machine Learning for Communications and Networking Systems," in IEEE Communications Surveys & Tutorials, vol. 22, No. 2, pp. 1392-1431, Secondquarter 2020, doi: 10.1109/COMST.2020.2975911. (Year: 2020).*

*Primary Examiner* — Neha Patel
*Assistant Examiner* — Jahed Ali
(74) *Attorney, Agent, or Firm* — Foley & Lardner LLP (57) ABSTRACT

Methods and systems use a second dataset comprising independently validated data based on labeled blockchain operations previously processed through the blockchain network. The use of the second dataset in conjunction with the dataset comprising labeled blockchain characteristics data received from a plurality of sources provides a comprehensive input for a machine learning model to identify and label suspicious blockchain operations. By doing so, the system mitigates fraudulent, criminal, or suspicious transactions. For example, the system may send an alert to a user if a behavior type is deemed a high risk by the machine learning model; the system may furthermore hold the funds associated with the blockchain operation in a separate account while the transaction is manually reviewed. Thus, the system may generate alerts to notify a user of a suspicious behavior type or suspicious blockchain operation, divert funds associated with the transaction, and conduct a manual review of suspicious blockchain operations.

20 Claims, 5 Drawing Sheets

(56) References Cited

U.S. PATENT DOCUMENTS

| | | | |
|---|---|---|---|
| 12,126,744 B2* | 10/2024 | Stock | H04L 9/0891 |
| 2016/0232516 A1* | 8/2016 | Dayan | G06Q 20/405 |
| 2018/0240107 A1* | 8/2018 | Andrade | G06Q 20/065 |
| 2018/0240112 A1* | 8/2018 | Castinado | H04L 9/0643 |
| 2019/0172067 A1* | 6/2019 | Arora | G06Q 20/4016 |
| 2019/0342095 A1* | 11/2019 | Simons | H04L 69/26 |
| 2019/0356471 A1* | 11/2019 | Vaughn | H04L 9/3247 |
| 2019/0362352 A1* | 11/2019 | Kumawat | G06Q 20/227 |
| 2020/0074518 A1* | 3/2020 | Kumaraswamy | G06Q 20/12 |
| 2020/0112444 A1* | 4/2020 | Yoshihama | H04L 43/0858 |
| 2021/0150623 A1* | 5/2021 | Rostami | G06Q 20/3676 |
| 2021/0158372 A1* | 5/2021 | Dittmann | G06F 21/44 |
| 2021/0234674 A1* | 7/2021 | Soroker | H04L 9/3213 |
| 2021/0264420 A1* | 8/2021 | Tammana | G06Q 20/02 |
| 2022/0068501 A1* | 3/2022 | Gholami | G16H 70/40 |
| 2022/0398572 A1* | 12/2022 | Lee | G06Q 20/389 |
| 2022/0414665 A1* | 12/2022 | Gelda | G06N 3/044 |
| 2023/0088674 A1* | 3/2023 | Lee | G06Q 20/389 |
| | | | 705/75 |
| 2023/0198785 A1* | 6/2023 | Henning | G06Q 20/36 |
| | | | 380/28 |
| 2023/0298016 A1* | 9/2023 | Osborn | H04L 63/12 |
| | | | 705/41 |
| 2023/0325814 A1* | 10/2023 | Vijayan | G06Q 20/3829 |
| | | | 705/66 |
| 2023/0334608 A1* | 10/2023 | Sansone | G06Q 30/06 |
| 2024/0007309 A1* | 1/2024 | Dowling | H04L 9/50 |
| 2024/0013177 A1* | 1/2024 | Sindi | G06Q 20/401 |
| 2024/0028107 A1* | 1/2024 | Willardson | H04W 12/33 |
| 2024/0135369 A1* | 4/2024 | Le Van Gong | G06Q 20/38215 |
| 2024/0281476 A1* | 8/2024 | Patt | H04L 9/3213 |
| 2024/0305482 A1* | 9/2024 | Patt | H04L 9/50 |

\* cited by examiner

SYSTEMS AND METHODS FOR ENTITY LABELING BASED ON BEHAVIOR

BACKGROUND

In recent years, the use of blockchains and blockchain technology has exponentially increased. Blockchains comprise a list of records, called "blocks," that are "chained" together using cryptography. Each block may comprise data that is computed using a one-way function (e.g., a function that is practically impossible to invert or reverse-compute) of a previous block, a timestamp (e.g., indicating a creation and/or modification time), and additional data (e.g., transactional or operational data related to blockchain operations).

While publicity for blockchains and blockchain technology has been concentrated on its use for cryptocurrencies and smart contracts, blockchains and blockchain technology may be applicable to numerous technological avenues. A common theme of the technological avenues is the manner in which blockchains and blockchain technology are decentralized such that facilitation, management, and/or verification of blockchain-based operations is governed or administered not by any one authority but instead by a community of users. The blockchain may therefore remain distributed (e.g., on a network of computers that communicate and coordinate their actions by passing messages to one another), and in many cases public, through a digital ledger, which records the series of blocks forming the chain. Notably, because each block depends on a preceding block, edits to existing blocks in the chain may not be made without affecting subsequent blocks.

Furthermore, updates to the blockchain (e.g., the addition of new blocks) may include incentivization systems that reward community members for the generation of the updates while also ensuring a consensus by the community. By doing so, the proliferation of the blockchain may proceed indefinitely.

Many blockchains have an associated cryptocurrency. Cryptocurrencies facilitate monetary transfers as well as blockchain-based processes. Despite mitigating systems, fraudulent, criminal, and suspicious activity persists on many popular blockchain networks. Reliably determining the authenticity and legality of blockchain transactions is paramount to ensuring trust among users.

SUMMARY

Systems and methods are described herein for novel uses and/or improvements to blockchains and blockchain technology. As one example, methods and systems are described herein for providing users with a real-time security action if a blockchain operation has a suspicious blockchain characteristic.

Conventional systems fail to provide comprehensive blockchain operation labeling because labeling blockchain operations can be time consuming and technically complex; furthermore, it requires a large amount of accurately labeled blockchain operations to create an independently validated database based on labeled blockchain operations previously processed through the blockchain network. For example, conventional systems may only use one dataset comprising labeled blockchain characteristics data received from a plurality of sources; if the dataset comprising a plurality of sources has low labeling accuracy, it may lead to a compromised or inefficient machine learning model.

To overcome these technical deficiencies in conventional systems, systems and methods disclosed herein include a second training dataset comprising independently labeled and validated blockchain operations previously processed on the blockchain. By using a dataset that is independently validated and based on labeled blockchain operations previously processed through the blockchain network, real-time, accurate blockchain operation labeling is possible. For example, the conventional approach to labeling blockchain operations may rely on data sources with low labeling accuracy and thus misclassify a blockchain operation; the system described herein may more accurately classify the blockchain operation due to higher quality data processing and a more advanced machine learning algorithm. Accordingly, the systems and methods provide users with a real-time notification and security action if a blockchain operation has a suspicious blockchain characteristic.

In some aspects, systems and methods for labeling blockchain operations are described. For example, the system may receive first blockchain data representing a first state of a blockchain network. The system may identify a first blockchain operation within the first blockchain data. They system may generate a first feature input based on a first blockchain characteristic of the first blockchain operation. The system may process the first feature input, using an artificial intelligence model, to generate a first output, wherein the artificial intelligence model is trained based on a first training dataset and a second training dataset, wherein the first training dataset comprises labeled blockchain characteristics data received from a plurality of sources, and wherein the second training dataset comprises independently validated data based on labeled blockchain operations previously processed through the blockchain network. The system may, prior to executing the first blockchain operation, determine, based on the first output, a first security action corresponding to the first blockchain operation. The system may generate for display, on a user interface of a user device, the first security action.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
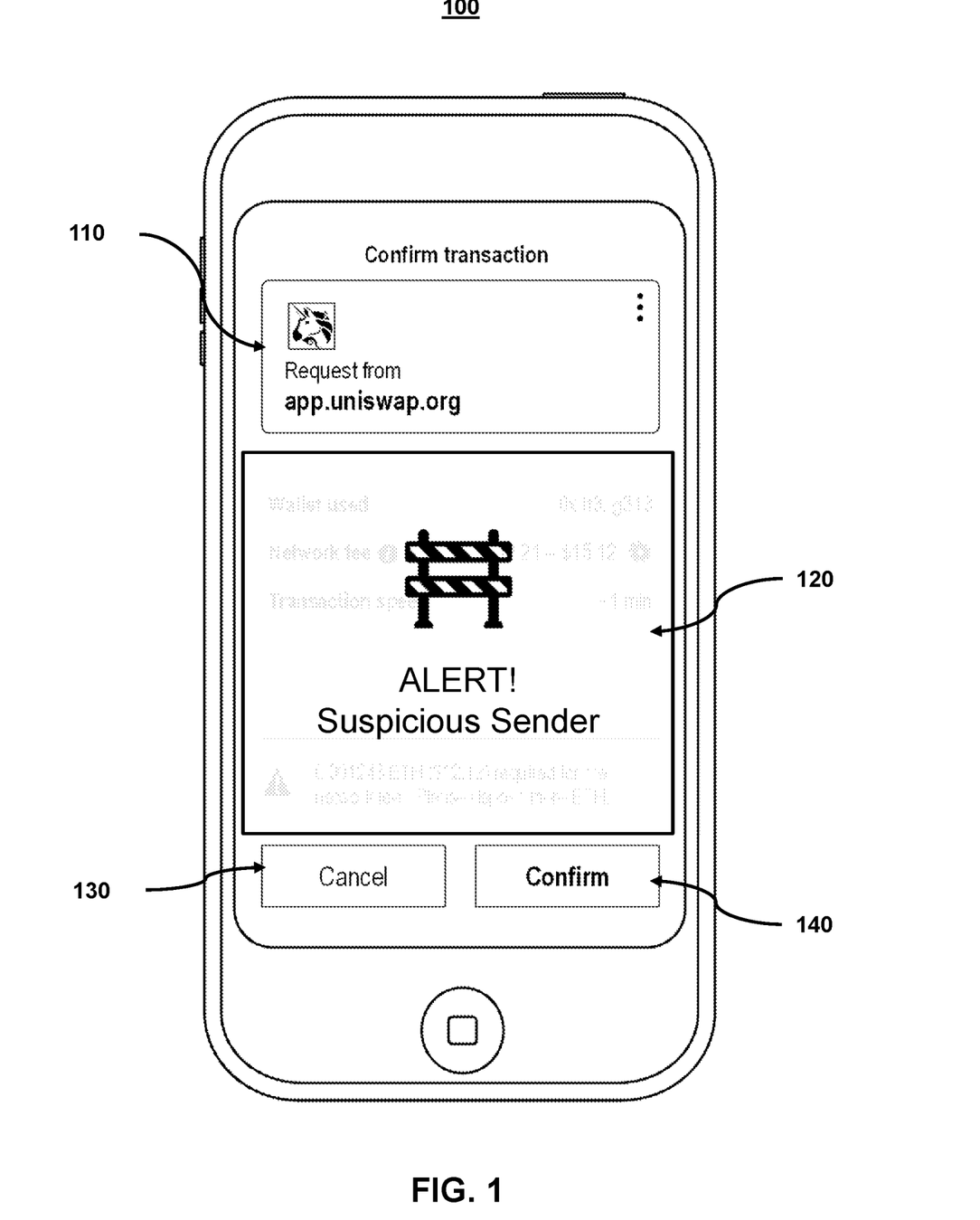
FIG. 1 shows an illustrative user interface of a security action, in accordance with one or more embodiments.

FIG. 1 shows an illustrative user interface of a security action, in accordance with one or more embodiments. For example, the user interface may indicate to a user that a blockchain operation has a blockchain characteristic with a certain behavior type and recommend a real-time security action. For example, FIG. 1 illustrates user interface 100, which displays a security action notification for a suspicious blockchain operation. In this example, blockchain operation 110 is a request for cryptocurrency. A machine learning algorithm is used to assess blockchain characteristics such as the sending address and the receipt address. For example, if the sending address has a blockchain characteristic that is known to be involved in a specific behavior type or already has an entity label, then alert 120 is displayed to the user. For example, the user notification allows a user to leverage the entity labeling produced by the machine learning algorithm to either confirm 140 or cancel 130 the transaction in question. As such, the system may prevent a user from unknowingly participating in a transaction with a suspicious entity.

The system may use blockchain characteristics. As referred to herein, a "blockchain characteristic" may include an attribute of a blockchain operation. For example, a blockchain characteristic may include the receipt address for the operation. In some embodiments, the blockchain characteristic may comprise a blockchain address.

In some embodiments, the system may determine blockchain characteristics by assessing the blockchain operation that is being processed on a blockchain. For example, by determining the sender blockchain address and the recipient blockchain address for a specific transaction, the system may determine a security risk level based on previously processed blockchain operations and recommend a security action.

The system may use digital signatures. As referred to herein, a "digital signature" refers to the process of authenticating transactions using asymmetric cryptography. The hash generated when processing a transaction on a blockchain helps ensure integrity and authenticity of transactions.

In some embodiments, the system may determine digital signatures by assessing the blockchain operation that is being processed on a blockchain. For example, by assessing the blockchain operation that is being processed on a blockchain, the system may determine a security risk level based on previously processed blockchain operations and recommend a security action.

The system may use entity labels. As referred to herein, an "entity label" may include assigning a label to a blockchain characteristic to associate the blockchain characteristic with a known entity. For example, blockchain operations are, by their nature, pseudonymous, and the identity of the parties involved in a blockchain operation may be unknown; to deanonymize blockchain characteristics, the system may label different blockchain characteristics with a known entity. For example, a blockchain characteristic may be associated with an entity such as a specific person, a nationality, or an organization.

In some embodiments, the entity label may comprise a behavior type. As referred to herein, a "behavior type" may include a set of behaviors common to a specific entity label or account on a blockchain. A common behavior may include routine payments from an individual to a subscription service, or a large volume of automated small transactions from a known or unknown entity, in an attempt to launch a denial-of-service attack. Common behaviors may be identified by the system by using a machine learning algorithm to perform pattern recognition on previous blockchain operations.

In some embodiments, the system may determine an entity label by referencing a dataset of previously labeled blockchain operations. For example, by determining if a similar blockchain operation has a label in a dataset, the system may not have to reassess the blockchain operation and instead can immediately recommend a security action. Additionally or alternatively, the system may determine an entity label by attributing a new entity label to a blockchain operation with an unlabeled blockchain characteristic, for example, by determining a security risk level for a blockchain operation or blockchain characteristic and assigning a corresponding label to store in a dataset for future reference. The system may benefit from labeling and storing blockchain operations in that assessing future blockchain operations may be more accurate.

The system may use a security action. As referred to herein, a "security action" is a step taken by the system in response to a security risk level. For example, a security action may include diverting funds or alerting a user to possible suspicious activity. In some embodiments, the security action may comprise an internal account address. In some embodiments, the security action may comprise a user alert to notify users of potentially suspicious blockchain operations.

In some embodiments, the system may determine a security action by assessing the security risk level of a blockchain operation or blockchain characteristic. For example, when determining a blockchain operation with a blockchain characteristic that has a high security risk level, a specific security action will be proposed. The system may prevent a blockchain operation with a high security risk level from being processed on the blockchain.

Figure 2:
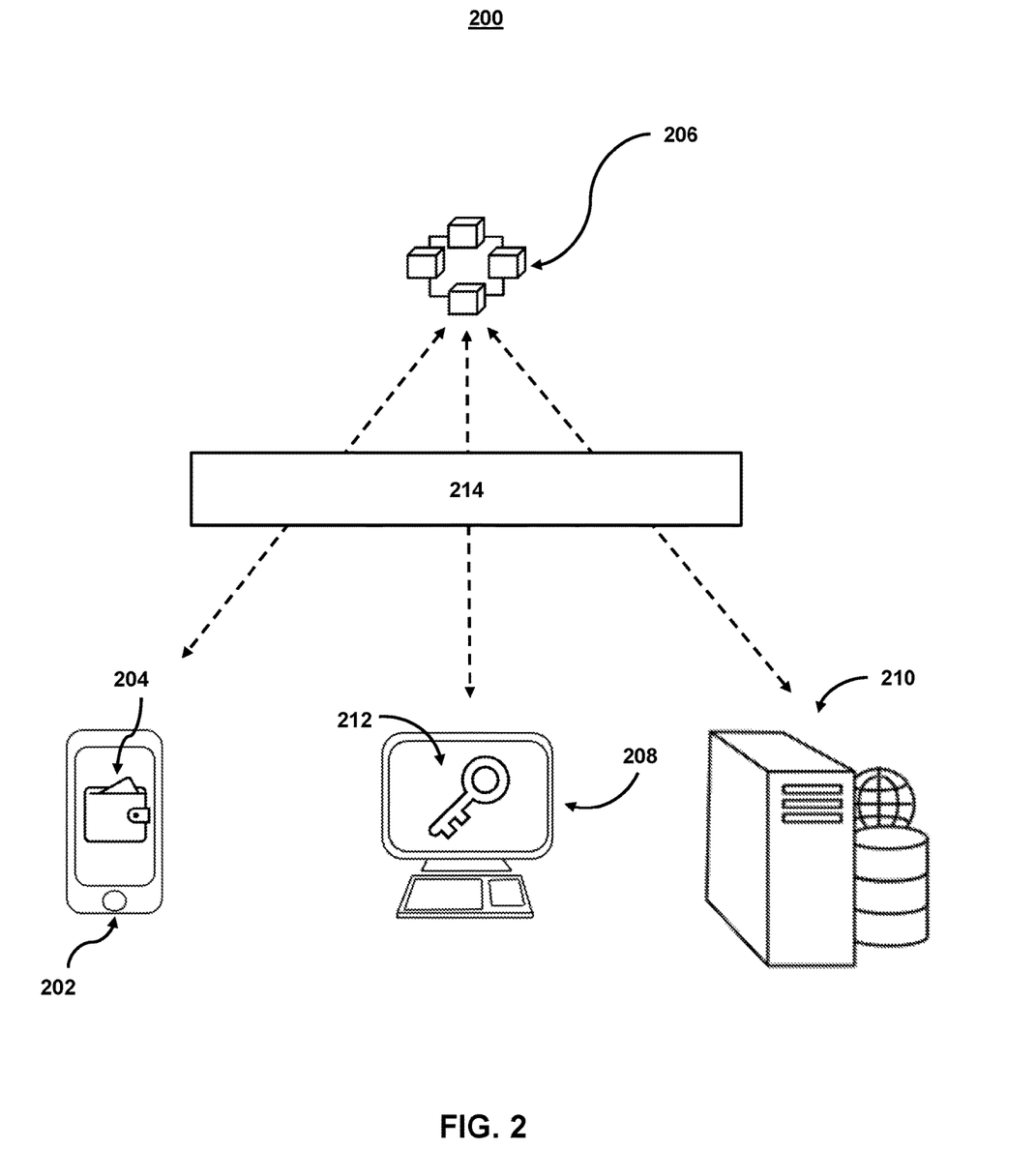
FIG. 2 shows an illustrative diagram for labeling blockchain operations, in accordance with one or more embodiments.

FIG. 2 shows an illustrative diagram for conducting blockchain operations, in accordance with one or more embodiments. For example, the diagram presents various components that may be used to determine the security risk level from a plurality of risk levels of a blockchain operation and select a corresponding security action from a plurality of security actions in some embodiments.

FIG. 2 includes user device 202. User device 202 may include a user interface. As referred to herein, a "user interface" may comprise a mechanism for human-computer interaction and communication in a device and may include display screens, keyboards, a mouse, and the appearance of a desktop. For example, a user interface may comprise a way a user interacts with an application or website in order to view and interact with security actions from a plurality of security actions based on the security risk level from a plurality of security risk levels, and the user interface may display content related to the proposed security action from a plurality of security actions. As referred to herein, "content" should be understood to mean an electronically consumable user asset, representations of goods or services (including nonfungible tokens), Internet content (e.g., streaming content, downloadable content, webcasts, etc.), video data, audio data, image data, and/or textual data, etc.

As shown in FIG. 2, system 200 may include multiple user devices (e.g., user device 202, user device 208, and/or user device 210). For example, system 200 may comprise a distributed state machine, in which each of the components in FIG. 2 acts as a client of system 200. For example, system 200 (as well as other systems described herein) may comprise a large data structure that holds not only all accounts and balances but also a state machine, which can change from block to block according to a predefined set of rules and which can execute arbitrary machine code. The specific rules of changing state from block to block may be maintained by a virtual machine (e.g., a computer file implemented on and/or accessible by a user device, which behaves like an actual computer) for the system.

It should be noted that, while shown as a smartphone 202, a personal computer 208, and a server 210 in FIG. 2, the user devices may be any type of computing device, including, but not limited to, a laptop computer, a tablet computer, a handheld computer, and/or other computing equipment (e.g., a server), including "smart," wireless, wearable, and/or mobile devices. It should be noted that embodiments describing system 200 performing a blockchain operation may equally be applied to, and correspond to, an individual user device (e.g., user device 202, user device 208, and/or user device 210) performing the blockchain operation. That is, system 200 may correspond to the user devices (e.g., user device 202, user device 208, and/or user device 210) collectively or individually.

Any blockchain operation conducted between a user device (e.g., user device 202, user device 208, and/or user device 210) and blockchain 206 with machine learning algorithm 214. Machine learning algorithm 214 determines the security risk level from a plurality of security risk levels a blockchain operation has in addition to recommending an appropriate security action from a plurality of security actions.

Each of the user devices may be used by the system to conduct blockchain operations and/or contribute to determining the security risk level from a plurality of security risk levels a blockchain operation has in addition to recommending an appropriate security action from a plurality of security actions. As referred to herein, "blockchain operations" may comprise any operations including and/or related to blockchains and blockchain technology. For example, blockchain operations may include conducting transactions, querying a distributed ledger, generating additional blocks for a blockchain, transmitting communications-related nonfungible tokens, performing encryption/decryption, exchanging public/private keys, and/or other operations related to blockchains and blockchain technology. In some embodiments, a blockchain operation may comprise the creation, modification, detection, and/or execution of a smart contract or program stored on a blockchain. For example, a smart contract may comprise a program stored on a blockchain that is executed (e.g., automatically, without any intermediary's involvement or time loss) when one or more predetermined conditions are met. In some embodiments, a blockchain operation may comprise the creation, modification, exchange, and/or review of a token (e.g., a digital blockchain-specific asset), including a nonfungible token. A nonfungible token may comprise a token that is associated with a good, a service, a smart contract, and/or other content that may be verified by, and stored using, blockchain technology.

In some embodiments, blockchain operations may also comprise actions related to mechanisms that facilitate other blockchain operations (e.g., actions related to metering activities for blockchain operations on a given blockchain network). For example, Ethereum, which is an open-source, globally decentralized computing infrastructure that executes smart contracts, uses a blockchain to synchronize and store the system's state changes. Ethereum uses a network-specific cryptocurrency called ether to meter and constrain execution resource costs. The metering mechanism is referred to as "gas." As the system executes a smart contract, the system accounts for every blockchain operation (e.g., computation, data access, transaction, etc.). Each blockchain operation has a predetermined cost in units of gas (e.g., as determined based on a predefined set of rules for the system). When a blockchain operation triggers the execution of a smart contract, the blockchain operation may include an amount of gas that sets the upper limit of what can be consumed in running the smart contract. The system may terminate execution of the smart contract if the amount of gas consumed by computation exceeds the gas available in the blockchain operation. For example, in Ethereum, gas comprises a mechanism for allowing Turing-complete computation while limiting the resources that any smart contract and/or blockchain operation may consume.

In some embodiments, gas may be obtained as part of a blockchain operation (e.g., a purchase) using a network-specific cryptocurrency (e.g., ether in the case of Ethereum). The system may require gas (or the amount of the network-specific cryptocurrency corresponding to the required amount of gas) to be transmitted with the blockchain operation as an earmark to the blockchain operation. In some embodiments, gas that is earmarked for a blockchain operation may be refunded back to the originator of the blockchain operation if, after the computation is executed, an amount remains unused.

As shown in FIG. 2, one or more user devices may include a cryptography-based, storage application (e.g., digital wallet 204) used to perform blockchain operations. The cryptography-based, storage application may be used to perform a plurality of blockchain operations across a computer network. The cryptography-based, storage application may, in some embodiments, correspond to a digital wallet. For example, the digital wallet may comprise a repository that allows users to store, manage, and trade their cryptocurrencies and assets, interact with blockchains, and/or conduct blockchain operations using one or more applications. The digital wallet may be specific to a given blockchain protocol or may provide access to multiple blockchain protocols. In some embodiments, the system may use various types of wallets such as hot wallets and cold wallets. Hot wallets are connected to the internet while cold wallets are not. Digital wallet holders may hold both a hot wallet and a cold wallet. Hot wallets are most often used to perform blockchain operations, while a cold wallet is generally used for managing a user account and may have no connection to the internet.

In some embodiments, the cryptography-based, storage application may correspond to a key-based wallet or a smart contract wallet. For example, a key based wallet may feature public or private keys and allow a user to either have control of the account or receive transactions in the account. A smart contract wallet may comprise blockchain programs or digital agreements that execute transactions between parties once a predetermined condition is met. For example, a smart contract wallet may be managed by a smart contract (e.g., or smart contract code) instead of a private key. As such, a smart contract wallet may improve speed, accuracy, trust, and/or transparency in blockchain operations. In some embodiments, a cryptography-based, storage application may include, or have access to, a key-based wallet or a smart contract wallet. For example, the cryptography-based, storage application may comprise a digital or other construct (e.g., a reference, a pointer, a text on a blockchain, an address, etc.).

As shown in FIG. 2, one or more user devices may include a private key (e.g., key 212) and/or digital signature. For example, system 200 may use cryptographic systems for conducting blockchain operations such as determining the security risk level from a plurality of security risk levels of a blockchain operation and proposing a security action from a plurality of security actions. For example, system 200 may use public-key cryptography, which features a pair of digital keys (e.g., which may comprise strings of data). In such cases, each pair comprises a public key (i.e., which may be public) and a private key (i.e., which may be kept private). System 200 may generate the key pairs using cryptographic algorithms (e.g., featuring one-way functions). System 200 may then encrypt a message (or other blockchain operation) using an intended receiver's public key such that the encrypted message may be decrypted only with the receiver's corresponding private key. In some embodiments, system 200 may combine a message with a private key to create a digital signature on the message. For example, the digital signature may be used to verify the authenticity of blockchain operations. As an illustration, when conducting blockchain operations, system 200 may use the digital signature to prove to every node in the system that it is authorized to conduct the blockchain operations.

For example, system 200 may comprise a plurality of nodes for the blockchain network. Each node may correspond to a user device (e.g., user device 208). A node for a blockchain network may comprise an application or other software that records and/or monitors peer connections to other nodes and/or miners for the blockchain network. For example, a miner comprises a node in a blockchain network that facilitates blockchain operations by verifying blockchain operations on the blockchain, adding new blocks to the existing chain, and/or ensuring that these additions are accurate. The nodes may continually record the state of the blockchain and respond to remote procedure requests for information about the blockchain.

For example, user device 208 may request a blockchain operation (e.g., conduct a transaction). The blockchain operation may be authenticated by user device 208 and/or another node (e.g., a user device in the community network of system 200). For example, using cryptographic keys, system 200 may identify users and give access to their respective user accounts (e.g., corresponding digital wallets) within system 200. Using private keys (e.g., known only to the respective users) and public keys (e.g., known to the community network), system 200 may create digital signatures to authenticate the users.

Following an authentication of the blockchain operation (e.g., using key 212), the blockchain operation may be authorized. For example, after the blockchain operation is authenticated between the users, system 200 may authorize the blockchain operation prior to adding it to the blockchain. System 200 may add the blockchain operation to blockchain 206. System 200 may perform this based on a consensus of the user devices within system 200. For example, system 200 may rely on a majority (or other metric) of the nodes in the community network (e.g., user device 202, user device 208, and/or user device 210) to determine that the blockchain operation is valid. In response to validation of the block, a node user device (e.g., user device 202, user device 208, and/or user device 210) in the community network (e.g., a miner) may receive a reward (e.g., in a given cryptocurrency) as an incentive for validating the block.

To validate the blockchain operation, system 200 may use one or more validation protocols and/or validation mechanisms. For example, system 200 may use a proof-of-work mechanism in which a user device must provide evidence that it performed computational work to validate a blockchain operation and thus this mechanism provides a manner for achieving consensus in a decentralized manner as well as preventing fraudulent validations. For example, the proof-of-work mechanism may involve iterations of a hashing algorithm. The user device that is successful aggregates and records blockchain operations from a mempool (e.g., a collection of all valid blockchain operations waiting to be confirmed by the blockchain network) into the next block. Alternatively or additionally, system 200 may use a proof-of-stake mechanism in which a user account (e.g., corresponding to a node on the blockchain network) is required to have, or "stake," a predetermined amount of tokens in order for system 200 to recognize it as a validator in the blockchain network.

In response to validation of the block, the block is added to blockchain 206, and the blockchain operation is completed. For example, to add the blockchain operation to blockchain 206, the successful node (e.g., the successful miner) encapsulates the blockchain operation in a new block before transmitting the block throughout system 200.

Figure 3:
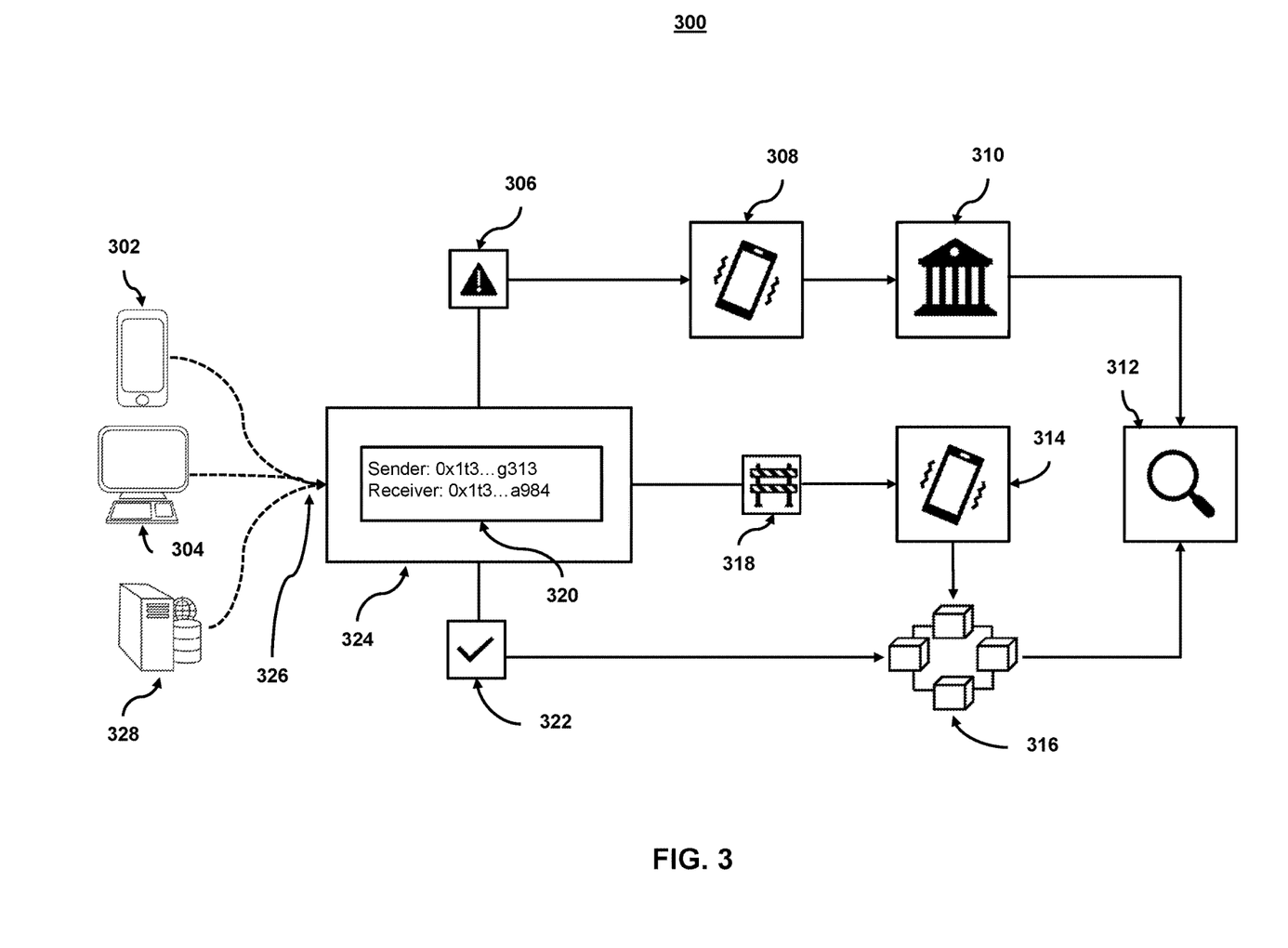
FIG. 3 shows an illustrative diagram of the know-your-transaction workflow, in accordance with one or more embodiments.

FIG. 3 shows an illustrative diagram of the know-your-transaction workflow, in accordance with one or more embodiments. For example, in some embodiments, system 300 may determine a security risk level from a plurality of security risk levels and a recommended security action from a plurality of security actions for a specific blockchain operation within a decentralized application environment. The know-your-transaction workflow may comprise user devices (e.g., user device 302, user device 304 and/or user device 328).

For example, input 326 may allow user devices (e.g., user device 302, user device 304 and/or user device 328) to conduct blockchain operations (e.g., corresponding to blockchain 316) to be conducted between the user devices in the network, without the need of any intermediaries or central authorities.

In some embodiments, the user devices of system 300 may comprise one or more cloud components. For example, cloud components may be implemented as a cloud computing system and may feature one or more component devices. It should also be noted that system 300 is not limited to three devices. Users may, for instance, utilize one or more devices to interact with one another, one or more servers, or other components of system 300. It should be further noted that while one or more operations (e.g., blockchain operations) are described herein as being performed by a particular component (e.g., user device 302) of system 300, those operations may, in some embodiments, be performed by other components of system 300. As an example, while one or more operations are described herein as being performed by components of user device 302, those operations may, in some embodiments, be performed by one or more cloud components. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components (e.g., user device 302 and user device 304, respectively). Additionally, or alternatively, a single user (and/or a user account linked to a single user) may interact with system 300 and/or one or more components of system 300 using two different components (e.g., user device 302 and user device 304, respectively).

With respect to the components of system 300, each of these devices may receive content and data via input/output (hereinafter "I/O") paths using I/O circuitry. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both user device 302 and user device 304 include a display upon which to display data (e.g., content related to one or more blockchain operations).

Additionally, the devices in system 300 may run an application (or another suitable program). The application may cause the processors and/or control circuitry to perform operations related to determining the security risk level and recommended security action for a blockchain operation within a decentralized application environment.

Each of these devices may also include electronic storages. The electronic storages may include non-transitory storage media that electronically stores information. The electronic storage media of the electronic storages may include one or both of (i) system storage that is provided integrally (e.g., is substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more optically readable storage media (e.g., optical disk, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes machine learning input 326, which may comprise communication paths between user devices. The communication paths may include the Internet, a mobile phone network, a mobile voice or data network (e.g., a 5G or LTE network), a cable network, a public switched telephone network, or other types of communication networks or combinations of communication networks. The communication paths may separately or together include one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices. For example, the communications may include various blockchain operations.

Machine learning input 326 is used as input for machine learning model 324 which assess various blockchain characteristics 320 such as sender and receiver blockchain address. The machine learning model 324 outputs a security risk level (e.g., high risk 306, medium risk 318, low risk 322). Security risk levels are determined by the machine learning algorithm which takes databases as input, the databases comprise several attributes of blockchain operations including behavior types, signature types, or blockchain characteristics.

Based on the security risk level generated by the machine learning algorithm 324, a security action 308 and 314 will be taken. Security action 308 and security action 314 may be a mobile alert notifying a user of a suspicious blockchain characteristic that is part of the associated blockchain operation. Depending on the security risk level, additional security actions will be taken. If the security risk level is high risk 306, then there will be an additional security action 310, such as diverting funds. Medium and low risk blockchain applications may eventually be accepted on blockchain 316. Regardless of security risk level, all blockchain operations that are assigned a security risk level are manually reviewed by a third party 312.

Figure 4:
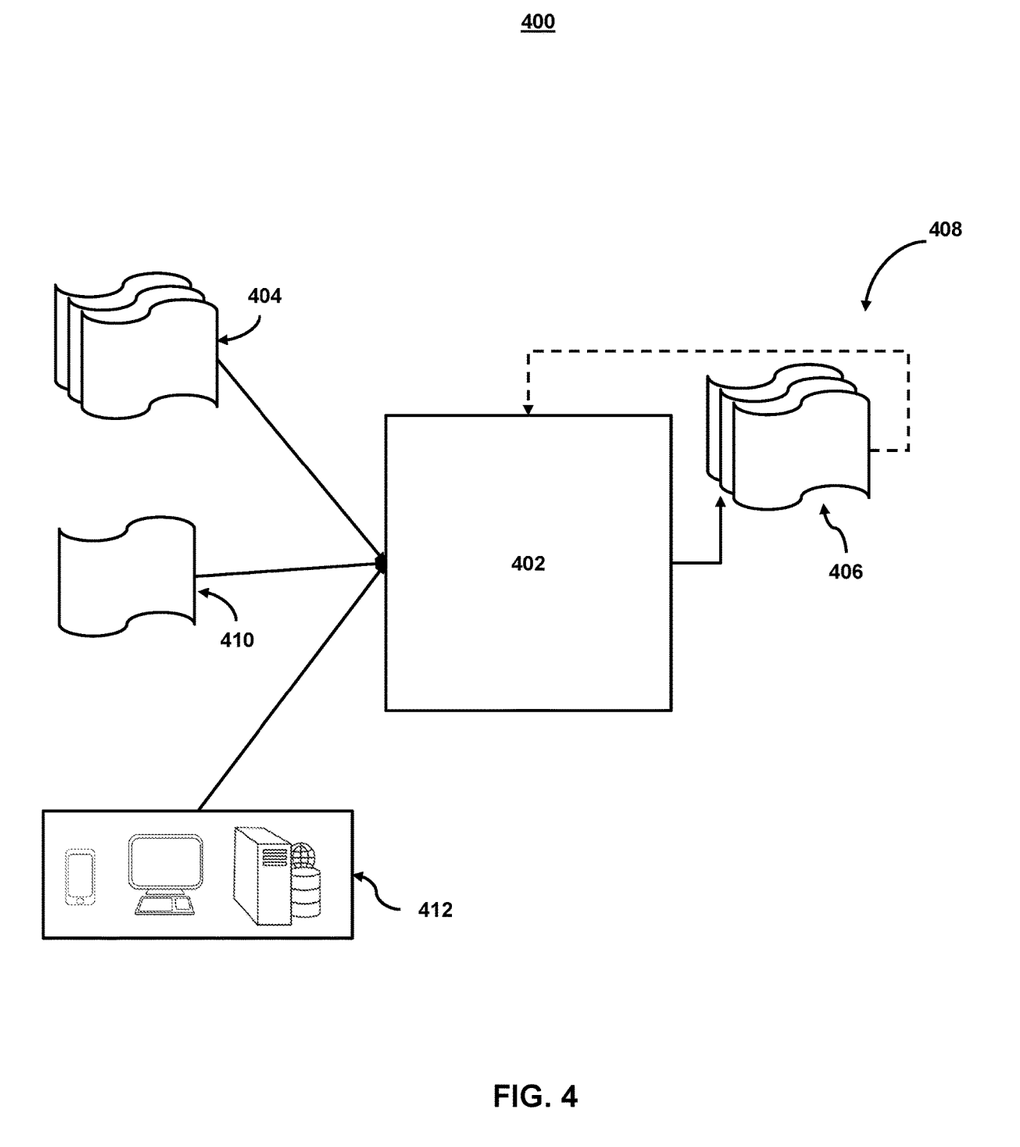
FIG. 4 shows an example machine learning model, in accordance with some embodiments

FIG. 4 shows an example machine learning model. One or more machine learning models discussed herein may be implemented, for example, as shown or described in connection with FIG. 4. With respect to FIG. 4, machine learning model 402 takes inputs 404, 410, and 412. Input 404 may comprise labeled blockchain characteristics data received from a plurality of sources. Input 410 may comprise independently validated data based on labeled blockchain operations previously processed through the blockchain network. Input 412 may include the blockchain operations sent or received by user devices.

As referred to herein, "independently validated data" may comprise data that has been subjected to comprehensive review, analysis, and testing, (software and/or hardware) performed by an objective known party to confirm (i.e., verify) that the requirements are correctly defined, and to confirm (i.e., validate) that the system correctly implements the required functionality and security requirements. In some embodiments, the requirements that are confirmed are the labeled entities and behavioral characteristics of those entities. For example, the system may perform blockchain operations directed to a specific entity to confirm a labeling of an entity. The system may similarly generate pattern data of blockchain operations for an entity and confirm that the pattern data matches predictions produced by an independent machine learning model. In such cases, the system may require data indicating a current state of a blockchain network and/or the effects of a blockchain operation on that current state. For example, the system may monitor the effect of one or more addresses and/or liquidity pools based on these blockchain operations. Pattern data generated by this information may then be used to confirm (or assign a probability of accuracy) to other data.

In some embodiments, independently validated data may be subject to threshold requirements for accuracy and/or precision. The system may then assign a weight to the independently validated data based on meeting one or more threshold requirements. The threshold requirements may be based on an amount of assets subject to the blockchain operations that were used for the independent validations, the frequency at which the blockchain operations that were used for the independent validations were performed, the number of the blockchain operations that were used for the independent validations, the number of the blockchain operations that were used for the independent validations that tested or verified a specific entity and/or address, the rate at which the frequency of the blockchain operations that were used for the independent validations changed, the number of different addresses of the blockchain operations that were used for the independent validations, or the type of blockchain operations (e.g., the function performed, the standard used, etc.) of the blockchain operations that were used for the independent validations.

The aforementioned threshold requirements (and whether specific data met or did not meet the requirement) may be recorded and stored with the results of the independently validated data as validation metadata. Accordingly, a dataset comprising independently validated data may not only include the results of the validations, but also metadata describing the threshold requirements as well as a quantitative (e.g., a number corresponding to the result) or qualitative metric (e.g., an indication of whether the threshold was met). As such, a feature input (e.g., for use in training a machine learning model and/or generating a prediction) may be based not only on the independently validated data, but also the validation metadata and/or specific quantitative and/or qualitative metrics corresponding to each threshold.

In one use case, outputs 406 may be fed back 408 to machine learning model 402 as inputs to train machine learning model 402 (e.g., alone or in conjunction with user indications of the accuracy of outputs 406, labels associated with the inputs, or with other reference feedback information). In another use case, machine learning model 402 may update its configurations (e.g., weights, biases, or other parameters) based on its assessment of its prediction (e.g., outputs 406) and reference feedback information (e.g., user indication of accuracy, reference labels, or other information). In another example use case, machine learning model 402 is a neural network and connection weights may be adjusted to reconcile differences between the neural network's prediction and the reference feedback. In a further use case, one or more neurons (or nodes) of the neural network may require that their respective errors be sent backward through the neural network to them to facilitate the update process (e.g., backpropagation of error). Updates to the connection weights may, for example, be reflective of the magnitude of error propagated backward after a forward pass has been completed.

In some embodiments, the machine learning model 402 may include an artificial neural network. In some embodiments, the machine learning model 402 may include an input layer and one or more hidden layers. Each neural unit of the machine learning model may be connected with one or more other neural units of the machine learning model 402. Such connections can be enforcing or inhibitory in their effect on the activation state of connected neural units. Each individual neural unit may have a summation function that combines the values of all of its inputs together. Each connection (or the neural unit itself) may have a threshold function that a signal must surpass before it propagates to other neural units. The machine learning model 402 may be self-learning or trained, rather than explicitly programmed, and may perform significantly better in certain areas of problem solving, as compared to computer programs that do not use machine learning. During training, an output layer of the machine learning model 402 may correspond to a classification, and an input known to correspond to that classification may be input into an input layer of the machine learning model during training. During testing, an input without a known classification may be input into the input layer, and a determined classification may be output. For example, the classification may be an indication of whether an action is predicted to be completed by a corresponding deadline or not. The machine learning model 402 may include one or more embedding layers at which information or data (e.g., any data or information discussed above in connection with FIGS. 1-3) is converted into one or more vector representations. The one or more vector representations of the message may be pooled at one or more subsequent layers to convert the one or more vector representations into a single vector representation.

The machine learning model 402 may be structured as a factorization machine model. The machine learning model 402 may be a non-linear model or supervised learning model that can perform classification or regression. For example, the machine learning model 402 may be a general-purpose supervised learning algorithm that the system uses for both classification and regression tasks. Alternatively, the machine learning model 402 may include a Bayesian model configured to perform variational inference. The machine learning model 402 may be configured to determine an efficient time to send data or a variety of other functions described herein.

Figure 5:
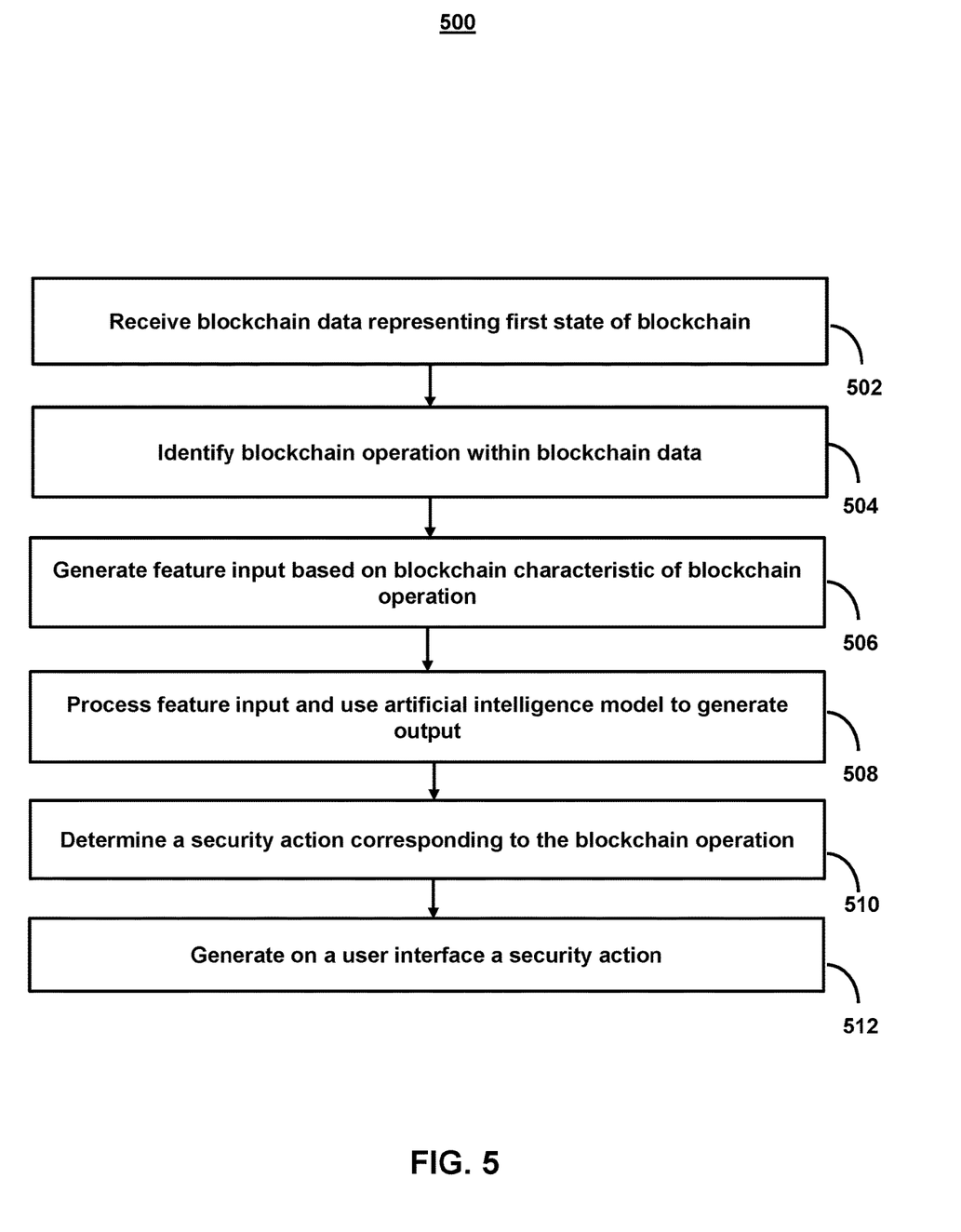
FIG. 5 shows a flowchart of the steps involved in labeling and determining a security action for a blockchain operation, in accordance with one or more embodiments.

FIG. 5 shows a flowchart of the steps involved in generating a security action for display on a user interface, in accordance with one or more embodiments. For example, the system may use process 500 (e.g., as implemented on one or more system components described above) in order to provide users with a real-time security action if a blockchain operation has a certain behavior type or blockchain characteristic.

At step 502, process 500 (e.g., using one or more components described above) receives blockchain data representing a first state of blockchain. For example, the system may receive first blockchain data representing a first state of a blockchain network. For example, the first blockchain data may comprise transaction data for blockchain operations. By doing so, the system may use the blockchain data received as an input to a machine learning model that may output a security action recommendation. The blockchain data received may provide an input for the machine learning model that will provide users with a real-time security action if a blockchain operation has a suspicious blockchain characteristic.

At step 504, process 500 (e.g., using one or more components described above) identifies a blockchain operation within blockchain data. For example, the system may identify a first blockchain operation within the first blockchain data. For example, a blockchain operation may be a current transaction submitted by the user. By doing so, the system may recommend a security action based on the identified blockchain operation from the blockchain data.

In some embodiments, a blockchain characteristic may include a signature type from a prior blockchain operation. For example, the system may comprise a signature type used for a previous blockchain operation. For example, a previous blockchain operation may involve a signature type that ensures the authenticity and integrity of the blockchain operation which may lead to a lower security risk level. By doing so, the system may ensure the authenticity and integrity of certain blockchain operations.

In some embodiments, a blockchain characteristic may include a smart contract type. For example, the system may comprise a smart contract type used for a previous blockchain operation. For example, a previous blockchain operation may involve a smart contract that was previously linked to fraudulent activity which may lead to a higher security risk level. By doing so, the system may ensure that a security action is presented to the user if a suspicious smart contract is a blockchain characteristic.

In some embodiments, a blockchain characteristic may include a behavior type. For example, the system may comprise a behavior type used for a previous blockchain operation. For example, a previous blockchain operation may have demonstrated a similar behavior linked to fraudulent activity which may lead to a higher security risk level. By doing so, the system may prevent repeated undesirable blockchain operations.

In some embodiments, a blockchain characteristic may include an entity label corresponding to a known receipt address. For example, the system may comprise an entity label corresponding to a known receipt address. For example, a previous blockchain characteristic may have an entity label based on a prior blockchain operation. By doing so, the system may quickly assess blockchain operations based on previously labeled blockchain characteristics from past blockchain operations.

At step 506, process 500 (e.g., using one or more components described above) generates a feature input based on a blockchain characteristic of a blockchain operation. For example, the system may generate a first feature input based on a first blockchain characteristic of the first blockchain operation. For example, a blockchain characteristic may be a receipt address for a transaction that may be used as an input for the machine learning algorithm. By doing so, the system may provide a security action that prevents a suspicious transaction from occurring.

In some embodiments, the system may determine a receipt address for a blockchain operation and generate a feature input based on the receipt address. For example, the system may determine a receipt address for the first blockchain operation and generate the first feature input based on the receipt address. For example, when creating a feature input the system may consider the receipt address of a blockchain operation. By doing so, the system may provide a more accurate security risk level for the blockchain operation.

At step 508, process 500 (e.g., using one or more components described above) processes a feature input and uses an artificial intelligence model to generate output. For example, the system may process the first feature input, using an artificial intelligence model, to generate a first output, wherein the artificial intelligence model is trained based on a first training dataset and a second training dataset, wherein the first training dataset comprises labeled blockchain characteristics data received from a plurality of sources, and wherein the second training dataset comprises independently validated data based on labeled blockchain operations previously processed through the blockchain network. For example, the system may use two datasets to ensure comprehensive review of future blockchain operations. By doing so, the system may be able to comprehensively label blockchain characteristics, provide a security risk level and recommend security action to help mitigate suspicious transactions from processing on a blockchain.

In some embodiments, the system may provide a security risk level for a certain receipt address. For example, the system may comprise a receipt address for the first blockchain operation, wherein the first output indicates a security risk level for the receipt address. For example, the system may provide a higher security risk level if a receipt address is known to have participated in previous blockchain operations with suspicious blockchain characteristics. By doing so, the system may recommend a security action that helps mitigate suspicious transactions from processing on a blockchain.

In some embodiments, the system may provide a security risk level based on a pattern of activity corresponding to the receipt address. For example, the system may determine a likelihood of a security risk for the first blockchain operation based on a pattern of activity corresponding to the receipt address. For example, the system may provide a higher security risk level if a receipt address demonstrates a pattern of suspicious activity on a blockchain. By doing so, the system may prevent an entity that has a pattern of suspicious activity from processing transactions on a blockchain.

At step 510, process 500 (e.g., using one or more components described above) determines a security action corresponding to the blockchain operation. For example, the system may determine, based on the first output, a first security action corresponding to the first blockchain operation. For example, a security action may include generating an alert or diverting funds. By doing so, the system may take a proactive step in preventing suspicious transactions from processing on a blockchain.

In some embodiments, the system may first determine a security risk level, then select a security action. For example, the system may determine, based on the first output, that the first blockchain operation has a first security risk level of a plurality of security risk levels, and based on the first blockchain operation having the first security risk level, select the first security action from a plurality of security actions. For example, the system may recommend diverting funds if the security risk level is high. By doing so, the system may prevent a suspicious blockchain operation from being validated on a blockchain.

At step 512, process 500 (e.g., using one or more components described above) generates, on a user interface, a security action. For example, the system may generate for display, on a user interface of a user device, the first security action. For example, if a user attempted to send cryptocurrency as part of a suspicious blockchain operation, an alert may appear notifying the user of the blockchain characteristic that is suspicious and requiring the user to confirm the transaction. By doing so, the system may help prevent inadvertent suspicious activity on a blockchain.

In some embodiments, the security action may generate an alert that requests a user's confirmation to authorize a blockchain operation. For example, the system may generate a first alert indicating that the first blockchain operation has a first security risk level of a plurality of security risk levels. The system may request, via the user interface of the user device, a user confirmation of the first alert. The system, in response to receiving the user confirmation, may authorize the first blockchain operation to be executed. For example, if a user attempts to participate in a blockchain operation with a high security risk level, the system may prompt the user to confirm the transaction prior to allowing the operation to be executed on a blockchain. By doing so, the system may prevent users from unintentionally participating in suspicious blockchain operations.

In some embodiments, the security action may generate an alert that automatically modifies a receipt address and performs the blockchain operation with the modified address. For example, the system may generate a first alert indicating that the first blockchain operation has a first security risk level of a plurality of security risk levels. The system may automatically modify a receipt address for the first blockchain operation, and automatically, without user input, perform the first blockchain operation with the modified receipt address. For example, if a blockchain operation has a suspicious blockchain characteristic the system may divert funds into a new internal account address automatically. By doing so, the system may mitigate a suspicious blockchain operation from being validated on a blockchain.

In some embodiments, the security action may request a user confirmation with a multifactor token and allow the operation to proceed upon receipt of the user confirmation. For example, the system may request, via the user interface of the user device, a user confirmation of a multifactor token, and in response to receiving the user confirmation, authorize the first blockchain operation to proceed. For example, the system may require a multifactor token if an address involved in the blockchain operation is sending or receiving a large volume of transactions in a short duration. By doing so, the system may prevent certain types of suspicious activity on a blockchain such as a denial-of-service attack.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. The method comprising: receiving first blockchain data representing a first state of a blockchain network; identifying a first blockchain operation within the first blockchain data; generating a first feature input based on a first blockchain characteristic of the first blockchain operation; processing the first feature input, using an artificial intelligence model, to generate a first output, wherein the artificial intelligence model is trained based on a first training dataset and a second training dataset, wherein the first training dataset comprises labeled blockchain characteristics data received from a plurality of sources, and wherein the second training dataset comprises independently validated data based on labeled blockchain operations previously processed through the blockchain network; prior to executing the first blockchain operation, determining, based on the first output, a first security action corresponding to the first blockchain operation; and causing to be generated for display, on a user interface of a user device, the first security action.
2. The method of any one of the preceding embodiments, wherein determining, based on the first output, the first security action corresponding to the first blockchain operation further comprises: determining, based on the first output, that the first blockchain operation has a first security risk level of a plurality of security risk levels; and based on the first blockchain operation having the first security risk level, selecting the first security action from a plurality of security actions.
3. The method of any one of the preceding embodiments, wherein the first blockchain characteristic comprises a receipt address for the first blockchain operation, and wherein the first output indicates a security risk level for the receipt address.
4. The method of any one of the preceding embodiments, wherein the first security action comprises: generating a first alert indicating that the first blockchain operation has a first security risk level of a plurality of security risk levels; requesting, via the user interface of the user device, a user confirmation of the first alert; and in response to receiving the user confirmation, authorizing the first blockchain operation to be executed.
5. The method of any one of the preceding embodiments, wherein the first security action comprises: generating a first alert indicating that the first blockchain operation has a first security risk level of a plurality of security risk levels; automatically modifying a receipt address for the first blockchain operation; and automatically, without user input, performing the first blockchain operation with the modified receipt address.
6. The method of any one of the preceding embodiments, wherein the first security action comprises: requesting, via the user interface of the user device, a user confirmation of a multifactor token; and in response to receiving the user confirmation, authorizing the first blockchain operation to proceed.
7. The method of any one of the preceding embodiments, further comprising: receiving second blockchain data representing a second state of the blockchain network; identifying a second blockchain operation within the second blockchain data; generating a second feature input based on a second blockchain characteristic of the second blockchain operation; processing the second feature input, using the artificial intelligence model, to generate a second output; and determining, based on the second output, to automatically proceed with the first blockchain operation without generating the first security action.
8. The method of any one of the preceding embodiments, wherein the labeled blockchain characteristics data comprises a signature type used for a previous blockchain operation.
9. The method of any one of the preceding embodiments, wherein the labeled blockchain characteristics data comprises a smart contract type used for a previous blockchain operation.
10. The method of any one of the preceding embodiments, wherein the labeled blockchain characteristics data comprises a behavior type used for a previous blockchain operation.
11. The method of any one of the preceding embodiments, wherein the labeled blockchain characteristics data comprises an entity label corresponding to a known receipt address.
12. The method of any one of the preceding embodiments, wherein generating the first feature input based on the first blockchain characteristic of the first blockchain operation comprises: determining a receipt address for the first blockchain operation; and generating the first feature input based on the receipt address.

13. The method of any one of the preceding embodiments, wherein processing the first feature input, using the artificial intelligence model, to generate the first output further comprises determining a likelihood of a security risk for the first blockchain operation based on a pattern of activity corresponding to the receipt address.

14. A tangible, non-transitory, machine-readable medium storing instructions that, when executed by a data processing apparatus, cause the data processing apparatus to perform operations comprising those of any of embodiments 1-13.

15. A system comprising one or more processors; and memory storing instructions that, when executed by the processors, cause the processors to effectuate operations comprising those of any of embodiments 1-13.

16. A system comprising means for performing any of embodiments 1-13.

What is claimed is:

1. A system for generating real-time security alerts for blockchain operations, the system comprising:
 a first cryptography-based, storage application,
  wherein the first cryptography-based, storage application corresponds to a first private key, and
  wherein the first private key is stored on a first user device;
 a second cryptography-based, storage application,
  wherein the second cryptography-based, storage application corresponds to a first partial private key and a second partial private key,
  wherein the first partial private key is stored on a remote device network, and
  wherein the second partial private key is stored on the first user device; and
 one or more computer processors configured to cause operations comprising:
  identifying a first blockchain operation within first blockchain data representing a first state of a blockchain network;
  generating a first feature input based on a receipt address for the first blockchain operation;
  processing the first feature input using an artificial intelligence model that is trained based on a first training dataset and a second training dataset comprising independently validated data that is assigned a weight to reconcile differences between predictions of the artificial intelligence model and reference feedback information,
   wherein the first training dataset comprises labeled blockchain characteristics data received from a plurality of sources, and
   wherein the independently validated data is based on labeled blockchain operations, previously processed through the blockchain network, directed to an entity to confirm a labeling of the entity;
  generating, based on processing the first feature input using the artificial intelligence model, a first output that indicates a security risk level, for the receipt address, corresponding to suspicious blockchain activity;
  modifying, based on the first output and prior to executing the first blockchain operation, the receipt address for the first blockchain operation to obtain a modified receipt address; and
  performing, without user input, the first blockchain operation with the modified receipt address to mitigate the suspicious blockchain activity from being validated on a blockchain.

2. A method for generating real-time security alerts for blockchain operations, the method comprising:
 receiving first blockchain data representing a first state of a blockchain network;
 identifying a first blockchain operation within the first blockchain data;
 generating a first feature input based on a first blockchain characteristic of the first blockchain operation, wherein the first blockchain characteristic is based on a receipt address for the first blockchain operation;
 processing the first feature input using an artificial intelligence model,
  wherein the artificial intelligence model is trained based on a first training dataset and a second training dataset,
  wherein the first training dataset comprises labeled blockchain characteristics data received from a plurality of sources,
  wherein the second training dataset comprises independently validated data that is based on labeled blockchain operations, previously processed through the blockchain network, directed to an entity to confirm a labeling of the entity, and
  wherein the independently validated data is assigned a weight to reconcile differences between predictions of the artificial intelligence model and reference feedback information;
 generating, based on processing the first feature input using the artificial intelligence model, a first output that indicates a security risk level, for the receipt address, corresponding to suspicious blockchain activity; and
 modifying, based on the first output and prior to executing the first blockchain operation, the receipt address for the first blockchain operation to obtain a modified receipt address;
 performing, without user input, the first blockchain operation with the modified receipt address to mitigate the suspicious blockchain activity from being validated on a blockchain.

3. The method of claim 2, further comprising:
 determining, based on the first output, that the first blockchain operation has the security risk level of a plurality of security risk levels.

4. The method of claim 2, further comprising:
 generating a first alert indicating that the first blockchain operation has the security risk level; and
 requesting a user confirmation of the first alert.

5. The method of claim 2, further comprising:
 generating a first alert indicating that the first blockchain operation has the security risk level.

6. The method of claim 2, further comprising:
 requesting a user confirmation of a multifactor token; and
 in response to receiving the user confirmation, authorizing the first blockchain operation to proceed.

7. The method of claim 2, further comprising:
 receiving second blockchain data representing a second state of the blockchain network;
 identifying a second blockchain operation within the second blockchain data;
 generating a second feature input based on a second blockchain characteristic of the second blockchain operation;

processing the second feature input, using the artificial intelligence model, to generate a second output; and determining, based on the second output, to automatically proceed with the first blockchain operation.

8. The method of claim 2, wherein the labeled blockchain characteristics data comprises a signature type used for a previous blockchain operation.

9. The method of claim 2, wherein the labeled blockchain characteristics data comprises a smart contract type used for a previous blockchain operation.

10. The method of claim 2, wherein the labeled blockchain characteristics data comprises a behavior type used for a previous blockchain operation.

11. The method of claim 2, wherein the labeled blockchain characteristics data comprises an entity label corresponding to a known receipt address.

12. The method of claim 2, wherein generating the first feature input based on the first blockchain characteristic of the first blockchain operation comprises:
  determining the receipt address for the first blockchain operation; and
  generating the first feature input based on the receipt address.

13. The method of claim 2, wherein processing the first feature input, using the artificial intelligence model, comprises determining a likelihood of a security risk for the first blockchain operation based on a pattern of activity corresponding to the receipt address.

14. One or more non-transitory, computer readable media having instructions recorded thereon, that, when executed by one or more processors, causes operations comprising:
  receiving first blockchain data representing a first state of a blockchain network;
  identifying a first blockchain operation within the first blockchain data;
  generating a first feature input based on a first blockchain characteristic of the first blockchain operation, wherein the first blockchain characteristic is based on a receipt address for the first blockchain operation;
  processing the first feature input using an artificial intelligence model
    wherein the artificial intelligence model is trained based on a first training dataset and a second training dataset,
    wherein the first training dataset comprises labeled blockchain characteristics data received from a plurality of sources, and
    wherein the second training dataset comprises independently validated data;
  generating, based on processing the first feature input using the artificial intelligence model, a first output that indicates a security risk level, for the receipt address, corresponding to suspicious blockchain activity;
  modifying, based on the first output and prior to executing the first blockchain operation, the receipt address for the first blockchain operation to obtain a modified receipt address;
  performing, without user input, the first blockchain operation with the modified receipt address to mitigate the suspicious blockchain activity from being validated on a blockchain.

15. The one or more non-transitory, computer readable media of claim 14, wherein the operations further comprise:
  determining, that the first blockchain operation has the security risk level of a plurality of security risk levels.

16. The one or more non-transitory, computer readable media of claim 14, wherein the operations further comprise:
  providing a first alert indicating that the first blockchain operation has the security risk level of a plurality of security risk levels.

17. The one or more non-transitory, computer readable media of claim 14, wherein the operations further comprise:
  generating a first alert indicating that the first blockchain operation has the first security risk level of a plurality of security risk levels.

18. The one or more non-transitory, computer readable media of claim 14, wherein the operations further comprise:
  requesting a user confirmation of a multifactor token.

19. The one or more non-transitory, computer readable media of claim 14, wherein the operations further comprise:
  receiving second blockchain data representing a second state of the blockchain network;
  identifying a second blockchain operation within the second blockchain data;
  generating a second feature input based on a second blockchain characteristic of the second blockchain operation;
  processing the second feature input, using the artificial intelligence model, to generate a second output; and
  determining, based on the second output, whether to automatically proceed with the first blockchain operation.

20. The method of claim 2, further comprising:
using a digital signature to execute the first blockchain operation.

* * * * *